Dec. 24, 1940.  G. J. ABBOTT  2,225,851
DRIVING BAND OR CHAIN
Filed Sept. 19, 1939  2 Sheets-Sheet 1
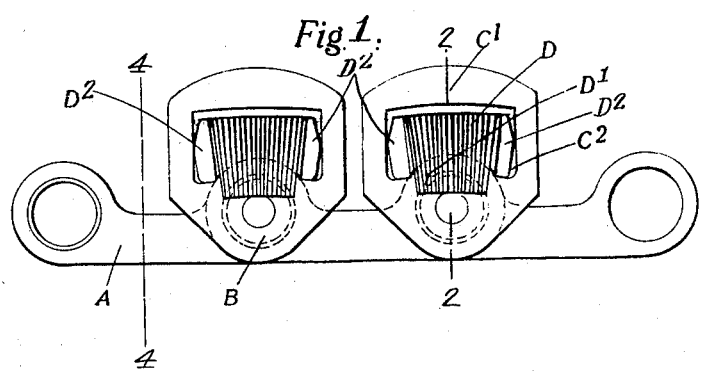
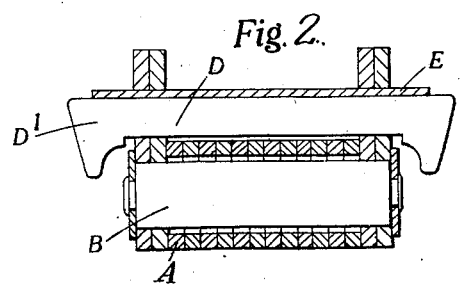
Inventor
G. J. ABBOTT
by Blair & Kilcoyne
Attorneys Dec. 24, 1940.   G. J. ABBOTT   2,225,851
DRIVING BAND OR CHAIN
Filed Sept. 19, 1939   2 Sheets-Sheet 2
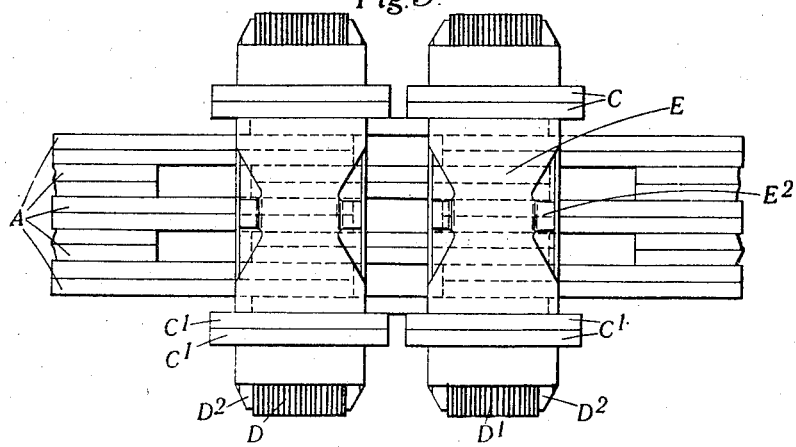
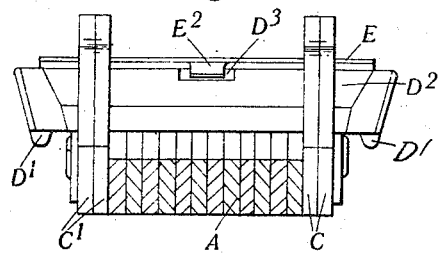
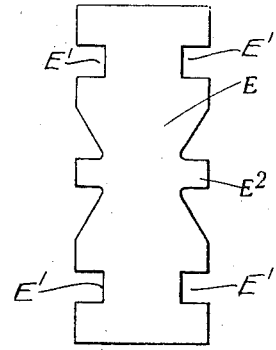
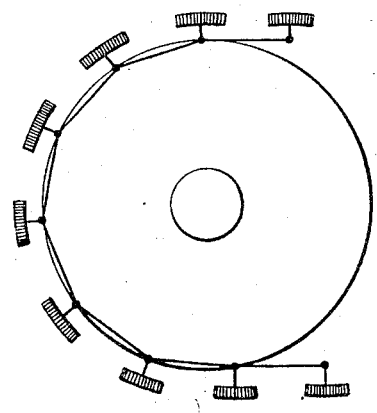
Inventor
by G. J. ABBOTT
Blair + Kilcoyne
Attorneys Patented Dec. 24, 1940

2,225,851

UNITED STATES PATENT OFFICE 2,225,851

DRIVING BAND OR CHAIN

Geoffrey Joseph Abbott, Carshalton, England, assignor to P. I. V. Chain Gears Limited, London, England, a company of England Application September 19, 1939, Serial No. 295,691
In Great Britain October 4, 1938

9 Claims. (Cl. 74—245)

This invention relates to power transmission apparatus of the kind comprising a chain carrying a series of plates, slats or like elements adapted to move across but not along the chain so that the ends of any two or more of these plates may form a combined tooth to engage depressions in the flanges of an expanding or other pulley of the kind commonly known as a V-pulley, that is to say having flanges so formed that the distance between them decreases progressively from the outer circumference towards the axis of rotation. The invention is thus applicable to transmission apparatus of the kind described in United States of America patent specification No. 1,601,662.

In such chains as at present employed each link of the chain is formed with a transverse slot in which is mounted a tubular sheath containing a pack or group of plates, the ends of which project from the open ends of the sheath to engage the pulley flanges, as described for example in United States of America patent specification No. 1,601,663 or No. 1,814,883.

For the sake of convenience the parts of the chain which lead to and from the pulley will be termed the straight parts of the chain while the part of the chain extending round a pulley and in which each link thus lies at an angle to its neighbor will be termed the curved part of the chain.

With the prior arrangement of chain referred to above certain effects reducing the efficiency and working life of the transmission apparatus tend to occur and the object of the present invention is to reduce or eliminate these effects.

To this end a chain for transmission apparatus of the kind referred to according to the present invention, comprises a series of links pivoted together and slat carriers each connected to the chain at the pivot where the two links are pivoted to one another and capable of rocking about the axis of the pivot relatively to the links. Conveniently the slat carriers are formed so that, assuming the chain to be straight, they extend outwards from the pivots, that is to say so that they will extend away from the axis of a pulley over which the chain passes although the ends of the slats which engage the pulley faces may extend inwards to points adjacent to or even beyond the axes of the pivots.

Further, the slat carriers are preferably so constructed that with the chain straight adjacent ends of these carriers lie adjacent to one another and are only so spaced from one another that the pivotal setting movement of each carrier which occurs as the slats therein move into engagement with the pulley will transmit a similar movement but in a less degree to one or more of the carriers immediately following it. Thus a proportion of the necessary setting movement is applied to each carrier before it reaches the pulley and the setting movement is therefore applied to each carrier more gradually.

The invention may be carrier into practice in various ways but one construction according to the invention is illustrated in Figures 1 to 5 of the accompanying drawings, in which Figure 1 is a side elevation of a short length of a construction of chain according to the invention, Figure 2 is a section on the line 2—2 of Figure 1, Figure 3 is a plan view of the construction shown in Figures 1 and 2, Figure 4 is a section on the line 4—4 of Figure 1, and Figure 5 is a plan view of the locking plate used in the construction shown in Figures 1 to 3.

In the construction illustrated in Figures 1 to 5 the chain comprises a series of links A each formed from a number of spaced parallel plates, connected by pivots B. Freely supported on each pivot is a slat carrier comprising two end plates C, $C^1$ lying adjacent to opposite sides of the chain and through which pass the ends of the pivot connecting the two adjacent links of the chain so that the end plates C, $C^1$ are free to rock about the axis of this pivot relatively to the links A. As shown these end plates C, $C^1$ extend outwards from the pivots B, that is to say in a direction away from the axes of the pulleys with which the chain is adapted to be used, and are provided with slots $C^2$ through which the pack of slats passes. Each slot is as shown wider at its ends than at its intermediate part and each pack of slats comprises a series of comparatively thin slats D lying in the intermediate parts of the slots and having enlarged ends $D^1$ as shown, and comparatively thick end slats $D^2$ which lie in the wider end parts of the slots $C^2$.

Extending between the end plates C, $C^1$ with its end portions passing through the slots $C^2$ and engaging the outer sides $C^3$ thereof so as to be engaged by and support the outer edges of the slats D, $D^2$, is a bearing plate E. The edges of the bearing plate are slotted at $E^1$ where this plate passes through the slots $C^2$ whereby lateral displacement of the bearing plate E is prevented. Moreover the end slats $D^2$ which are conveniently so shaped in relation to the ends of the slots $C^2$ as to be capable of limited rocking movement relatively to the slat carrier about an axis parallel to the chain pivots, have recesses $D^3$ in the centres of their outer edges into which are pressed tongues $E^2$ on the bearing plate E to retain the end slats in position after assembly.

Thus in assembling a pack of slats in a slat carrier constructed as shown, the bearing plate E is first inserted by passing it in a horizontal plane through the slots $C^2$ and then moving it outwards into position so that the slots $E^1$ in the edges of the bearing plate are engaged by the slots $C^2$. The intermediate slats are then passed through the slots $C^2$ in a plane inclined or at right angles to that they eventually occupy and are swung into their correct position. Finally, the end slats $D^2$ are inserted and the tongues $E^2$ on the bearing plate bent so as to engage the recesses $D^3$ so that the assembly is thus maintained in its assembled state.

Figure 6 shows diagrammatically part of a form of chain according to the invention. In this figure the chain is shown as it would lie when engaging with a pulley, with the axes of the pivots connecting the links lying on circles of the same radius.

It will be seen that according to the invention seven packs of slats will engage the pulley with a maximum driving efficiency.

With the present invention it is also possible to increase the length of each pack of slats for a given length of link since space for the pivot does not have to be provided between adjacent packs of slats. This also has the advantage that a larger pivot can be used without reducing the lengths of the packs of slats.

It will also be seen that in a chain according to the invention the packs of slats in engagement with the pulley tend to be effective at all times with a progressive reduction in the load on the packs of slats from the driving to the slack side of the chain. Again, the slat carriers do not tend to be tilted forwards by the pulley on the chain, with the resulting tendency for the leading slats in each pack to be subject to greater pressure, but on the contrary any tendency to tilt will be in the backward direction and will thus tend to throw the greater pressure on the rear slats in each pack as is desirable for the firmest engagement with the pulley.

As will be seen from Figure 6 the packs of slats also tend to be lifted bodily out of the recesses in the pulley in a direction parallel to the driving edges of the slats, the ability of the slat carriers to rock freely relatively to the pivots facilitating this action. Again with the invention if one pack of slats tends to take too great a load the slat carrier will tend to rock so as to tighten up the next link and thus transfer the excess load to the next pack, whereby an even distribution of the load throughout the packs with a progressive reduction in load on the packs from the driving to the slack side of the chain is assisted.

The ability of the slat carriers to rock backwards relatively to the links also allows for the packs of slats lying adjacent the driving side of the chain to be operating on a slightly smaller diameter than those adjacent the slack side of the chain without the slats dragging across the edges of the depressions in the pulley flanges. In this connection, it should be borne in mind that in the preferred construction the slats themselves are capable of rocking to a limited extent in the slat carriers by reason of the formation of the rear faces of the end slats where these engage the ends of the slots in the end plates of the carriers so that slight rocking of each slat carrier can occur without the edges of the slats being moved out of parallelism with the edges of recesses in the pulley flanges.

Finally, since adjacent slat carriers in the preferred construction according to the invention lie close to one another, any backward setting movement imparted to a slat carrier as it comes into engagement with a pulley to bring the edges of these slats parallel to the edges of the recesses in the pulley, will impart a similar movement in a less degree to one or more of the slat carriers behind it so that any necessary setting movement is applied to each carrier progressively, theoretically in a series of two or more steps but probably in practice as a substantially continuous movement as the carrier approaches and finally engages with the pulley.

It is to be understood that the constructions more particularly described above, are given by way of example only and that constructional details may be modified considerably without departing from this invention.

What I claim as my invention and desire to secure by Letters Patent is:

1. A chain for transmission apparatus of the kind referred to comprising a series of links pivoted together and slat carriers each connected to the chain at the point where two links are pivoted to one another and capable of rocking about the axis of the pivot relatively to the links.

2. A chain as claimed in claim 1, in which the slat carriers are so formed that, assuming the chain to be straight, they extend outwards from the pivots.

3. A chain as claimed in claim 1, in which the ends of the slats which engage the pulley faces extend inwards beyond the intermediate parts of the slats to points substantially adjacent the axes of the pivots.

4. A chain as claimed in claim 1, in which the slat carriers are so constructed and spaced that with the chain straight the adjacent ends of these carriers lie so adjacent to one another that the pivotal setting movement of each carrier which occurs as the slats therein move into engagement with the pulley, transmits a similar movement but in a less degree to one or more of the carriers immediately following it.

5. A chain as claimed in claim 1, in which each slat carrier has a pack of slats and comprises two end plates lying adjacent to opposite sides of the chain and through which pass the ends of a pivot pin connecting the two adjacent links of the chain so that the end plates are free to rock about the axis of this pivot relatively to the links, the end plates extending outwards from the pivots and being provided with slots through which the pack of slats passes, and a bearing plate extending between the end plates with its end portions passing through the slots in the end plates and engaging the outer sides of these slots, said bearing plate being engaged by and supporting the outer edges of the slats.

6. A chain for transmission apparatus of the kind referred to, comprising a series of links pivoted together and slat carriers each connected to the chain at the point where two links are pivoted to one another and capable of rocking about the axis of the pivot relatively to the links, each slat carrier having a pack of slats and comprising two end plates lying adjacent to opposite sides of the chain and through which pass the ends of a pivot pin connecting the two adjacent links of the chain so that the end plates are free to rock about the axis of this pivot relatively to the links, the end plates extending outwards from the pivots and being provided with slots through which the pack of slats passes, and a bearing plate extending between the end plates with its end portions passing through the slots in the end plates and engaging the outer sides of these slots, said bearing plate being engaged by and supporting the outer edges of the slats, the edges of said bearing plates being slotted where said plate passes through the slots in the end plates to engage inward projections at the ends of the outer sides of the slots in the end plates to prevent lateral displacement of the bearing plate in the end plates.

7. A chain as claimed in claim 6, in which each end slat of a pack is provided with a recess engaged by a projection on the bearing plate.

8. A chain as claimed in claim 6, in which the end slats are so formed in relation to the ends of the slots in the end plates against which they bear as to be capable of limited rocking movement relatively to the slat carrier about an axis parallel to the axis of the chain pivots.

9. A chain as claimed in claim 6 in which the slots in the end plates are deeper at their ends measured in a direction at right angles to the plane containing the axes of the pivots, the end slats in the pack being similarly deeper than the intermediate parts of the intermediate slats but less deep than the end parts of the intermediate slats.

GEOFFREY JOSEPH ABBOTT.